US012761745B2

(12) United States Patent
Lu et al.

(10) Patent No.: US 12,761,745 B2
(45) Date of Patent: Oct. 13, 2026

(54) MOUSE PAD

(71) Applicant: DEXIN CORPORATION, New Taipei City (TW)

(72) Inventors: Ho-Lung Lu, New Taipei City (TW); Yi-Chen Liu, New Taipei City (TW)

(73) Assignee: DEXIN CORPORATION, New Taipei City (TW)

( * ) Notice: Subject to any disclaimer, the term of this patent is extended or adjusted under 35 U.S.C. 154(b) by 0 days.

(21) Appl. No.: 19/303,378

(22) Filed: Aug. 19, 2025

(65) Prior Publication Data

US 2026/0186592 A1 Jul. 2, 2026

Related U.S. Application Data

(60) Provisional application No. 63/739,100, filed on Dec. 26, 2024.

(30) Foreign Application Priority Data

Apr. 11, 2025 (TW) ................................ 114113672

(51) Int. Cl.
*G06F 3/039* (2013.01)
*F21V 8/00* (2006.01)

(52) U.S. Cl.
CPC ......... *G06F 3/0395* (2013.01); *G02B 6/0021* (2013.01); *G02B 6/0031* (2013.01); *G02B 6/0083* (2013.01)

(58) Field of Classification Search
CPC ............................ G02B 6/0021; G06F 3/0395
See application file for complete search history.

(56) References Cited

U.S. PATENT DOCUMENTS

2018/0239073 A1* 8/2018 Chou .................. G02B 6/0078
2019/0302906 A1* 10/2019 Chou .................. G06F 3/0395

* cited by examiner

*Primary Examiner* — Keith G. Delahoussaye
(74) *Attorney, Agent, or Firm* — Li & Cai Intellectual Property Office

(57) ABSTRACT

A mouse pad includes a full flat contact surface, a contact plate, a light guide body, a base, and a light emitting module. The full flat contact surface is arranged on one side surface of the mouse pad. The light guide body is located between the contact plate and the base and has a plurality of light guide holes. The light emitting module includes a circuit board and a plurality of light emitting units. The circuit board is located between the light guide body and the base. The plurality of light emitting units are disposed on the circuit board and are respectively located in the plurality of light guide holes. The light beams emitted are emitted outward from an edge of the light guide body, and a second top surface of each of the light emitting units is shielded by the contact plate.

13 Claims, 10 Drawing Sheets

MOUSE PAD

CROSS-REFERENCE TO RELATED PATENT APPLICATION

This application claims the benefit of priorities to U.S. Patent Application Nos. 63/739,100, filed on Dec. 26, 2024, and Taiwan Patent Application Nos. 114113672, filed on Apr. 11, 2025. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse pad, and more particularly to a mouse pad with a lighting function.

BACKGROUND OF THE DISCLOSURE

In the related art, one side of a conventional mouse pad with a lighting function usually has a control box, and the control box is a protruding structure that occupies a portion of the conventional mouse pad. Therefore, when the mouse moves on the mouse pad, the mouse may easily collide with the control box, thereby causing inconvenience to a user.

SUMMARY OF THE DISCLOSURE

In response to the above-referenced technical inadequacies, the present disclosure provides a mouse pad that is mainly used to improve a conventional mouse pad with a lighting function, and the conventional mouse pad has a protruding structure such as a control device, etc., which may cause inconvenience to a user.

In order to solve the above-mentioned problems, one of the technical aspects adopted by the present disclosure is to provide a mouse pad. The mouse pad includes a full flat contact surface, a contact plate, a light guide body, a base, and a light emitting module. The full flat contact surface is arranged on one side surface of the mouse pad. The full flat contact surface is configured to allow a mouse to move to any position thereof. One side surface of the contact plate defines an entirety of the full flat contact surface. The light guide body has two opposite side surfaces that are respectively defined as a first top surface and a first bottom surface. The contact plate is disposed on the first top surface, the light guide body has a plurality of light guide holes, and each of the light guide holes penetrates through the light guide body. The base is disposed on the first bottom surface of the light guide body, and the light guide body is located between the contact plate and the base. The light emitting module includes a circuit board and a plurality of light emitting units. The circuit board is disposed on the first bottom surface of the light guide body, and the circuit board is located between the light guide body and the base. The plurality of light emitting units are disposed on the circuit board. The plurality of light emitting units are respectively located in the plurality of light guide holes, light beams emitted from the plurality of light emitting units are emitted outward from an edge of the light guide body by being guided through the light guide body, and a second top surface of each of the light emitting units is shielded by the contact plate.

In order to solve the above-mentioned problems, another one of the technical aspects adopted by the present disclosure is to provide a mouse pad. The mouse pad includes a full flat contact surface, a contact plate, a light guide body, a base, and a light emitting module. The full flat contact surface is arranged on one side surface of the mouse pad. The full flat contact surface is configured to allow a mouse to move to any position thereof. One side surface of the contact plate defines an entirety of the full flat contact surface. The light guide body has two opposite side surfaces that are respectively defined as a first top surface and a first bottom surface. The contact plate is disposed on the first top surface, the light guide body has a plurality of light guide holes, and each of the light guide holes penetrates through the light guide body. The base is disposed on the first bottom surface of the light guide body, and the light guide body is located between the contact plate and the base. The light emitting module includes a circuit board and a plurality of light emitting units. The circuit board is disposed in a light-shielding member receiving groove of the first top surface of the light guide body, the circuit board is located between the contact plate and the light guide body, and a depth of the light-shielding member receiving groove is not less than a thickness of the circuit board. The plurality of light emitting units are disposed on the circuit board, the plurality of light emitting units are respectively located in the plurality of light guide holes, and light beams emitted from the plurality of light emitting units are emitted outward from an edge of the light guide body by being guided through the light guide body.

Therefore, in the mouse pad provided by the present disclosure, by virtue of the design of the full flat contact surface, the contact plate, the light guide body, the base, and the light emitting module, the mouse set on the full flat contact surface can be moved to any position according to practical requirements of the user, thereby effectively improving the user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
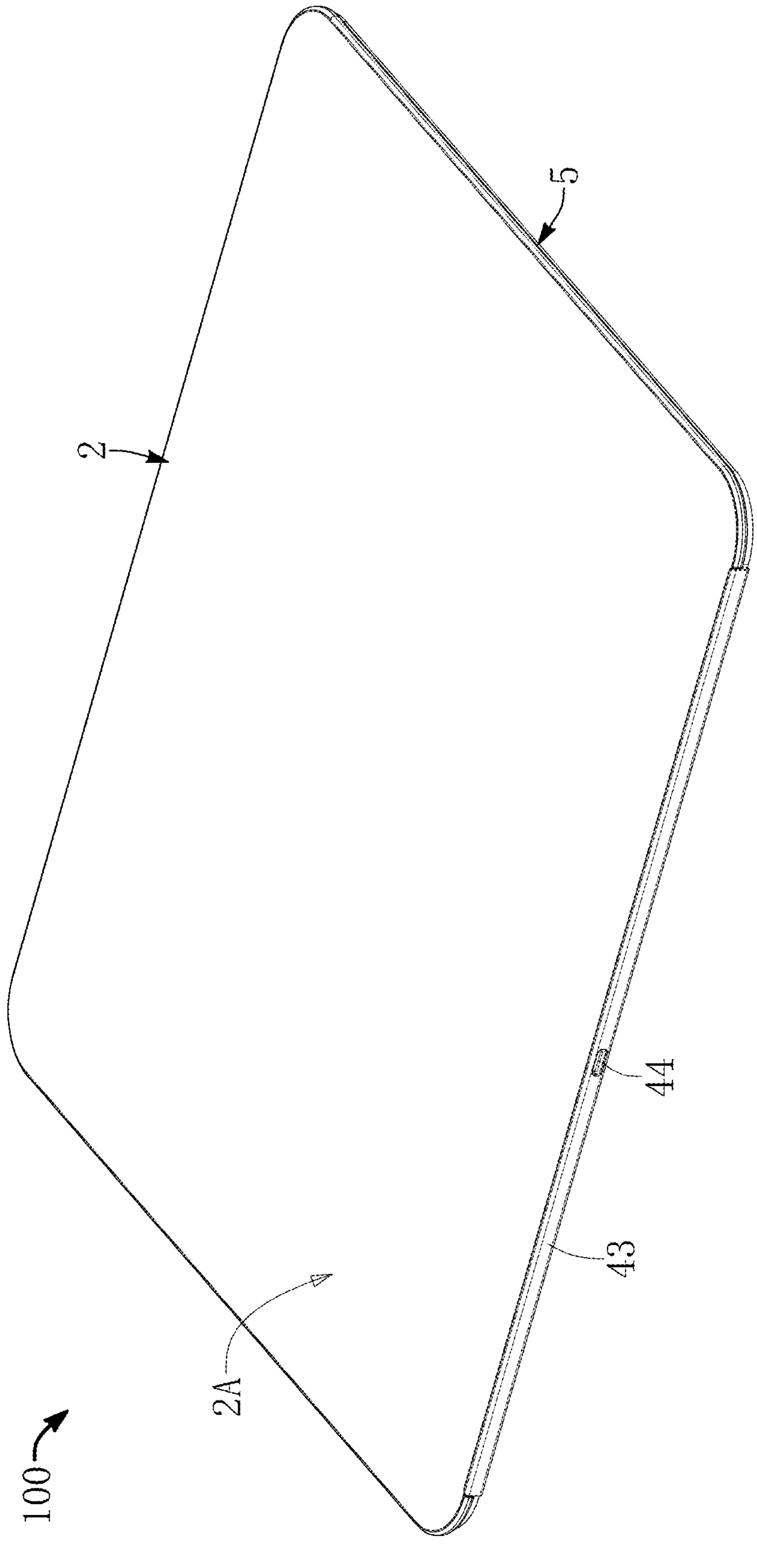
FIG. 1 and FIG. 2 are schematic views showing a mouse pad in different angles of view according to a first embodiment of the present disclosure.
Figure 2:
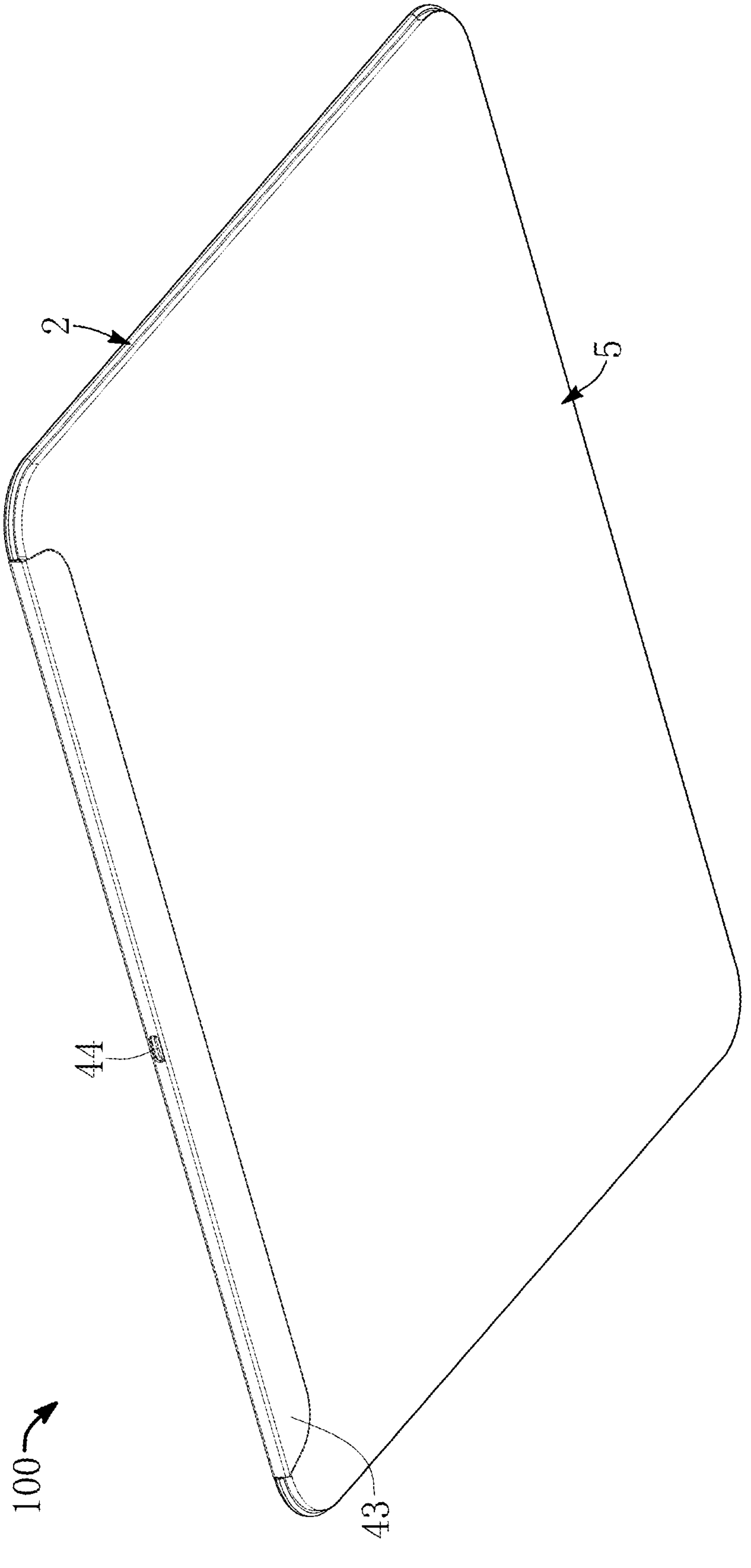

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 3:
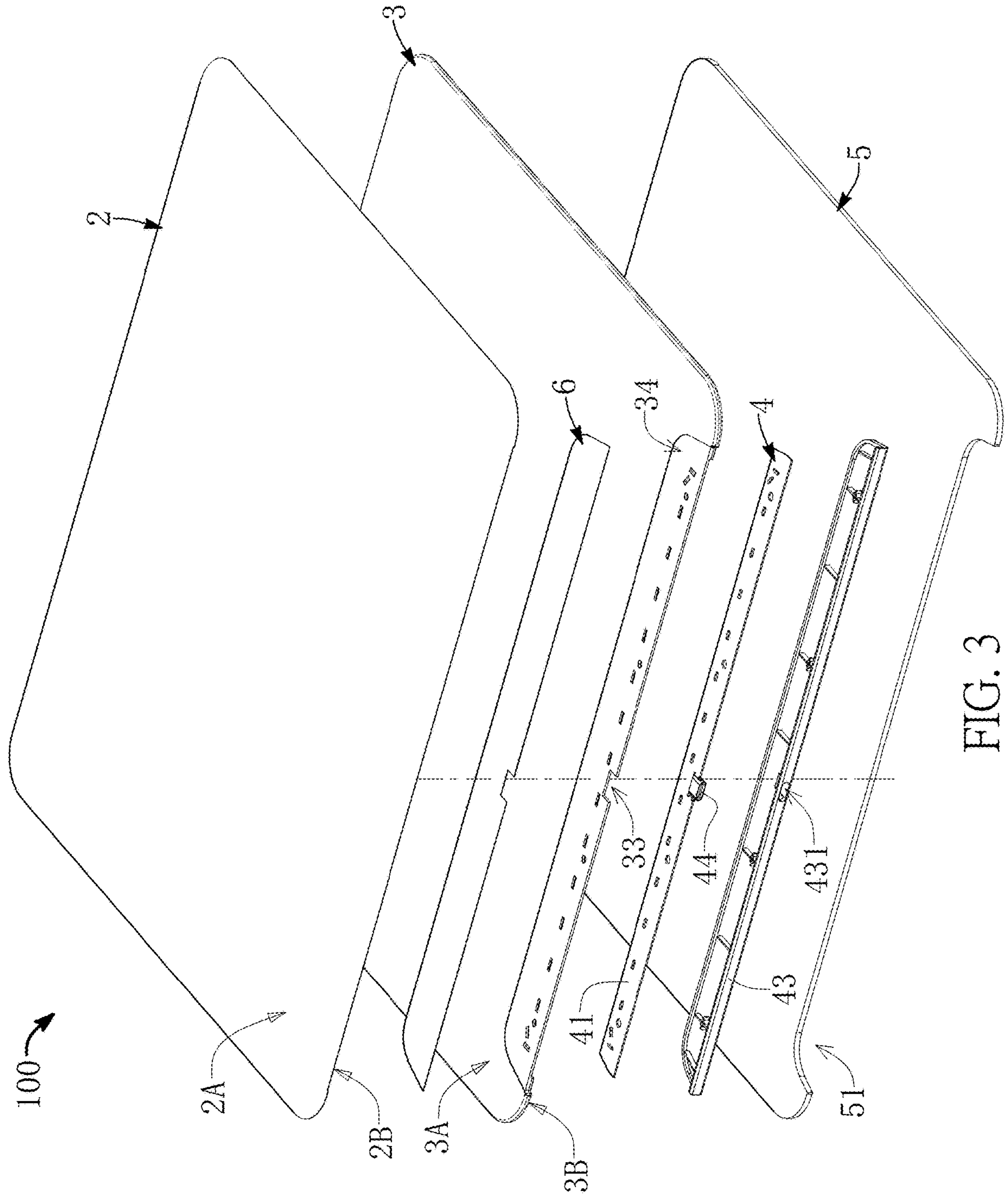
FIG. 3 and FIG. 4 are exploded views showing the mouse pad in different angles of view according to the first embodiment of the present disclosure.
Figure 4:
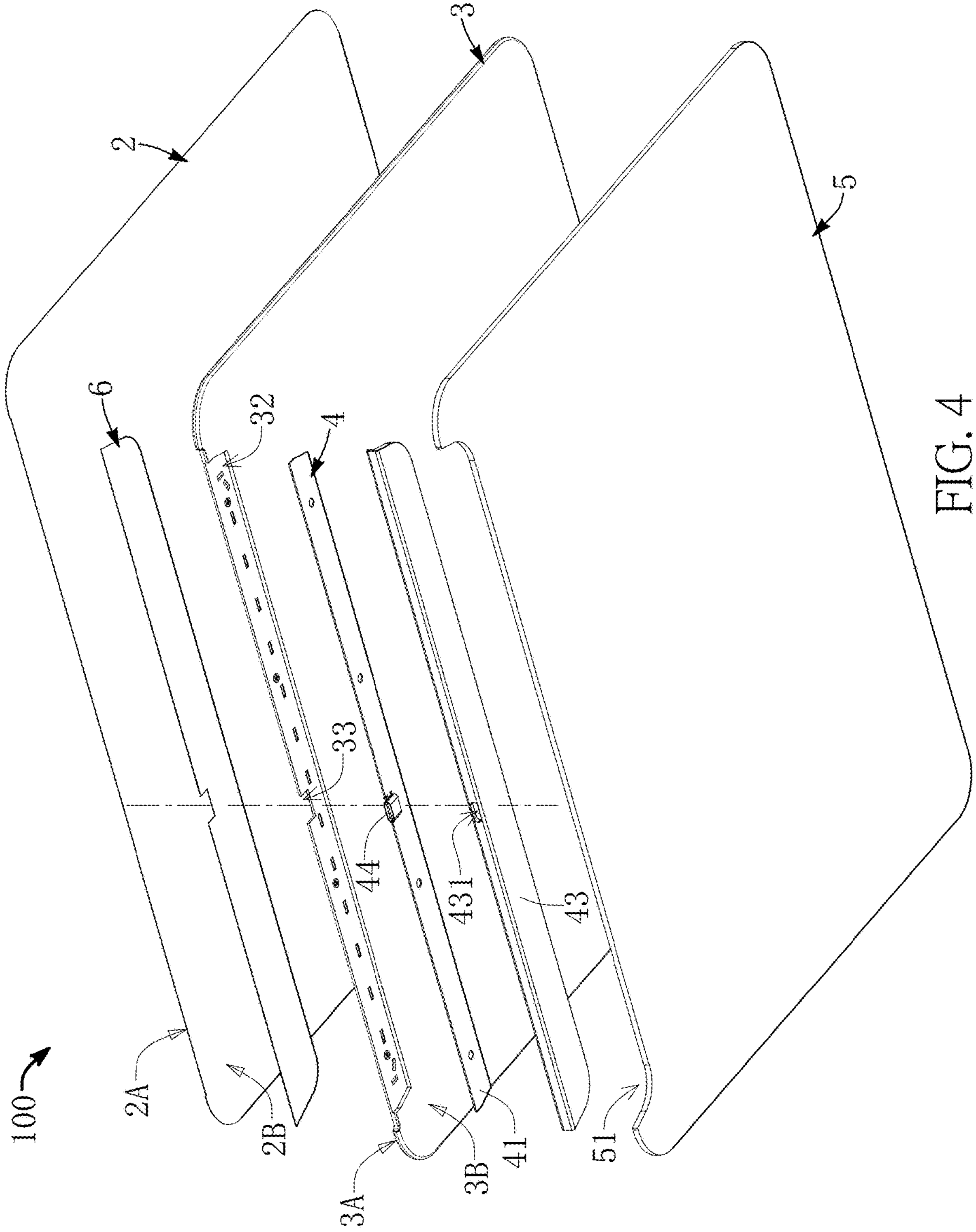
Figure 5:
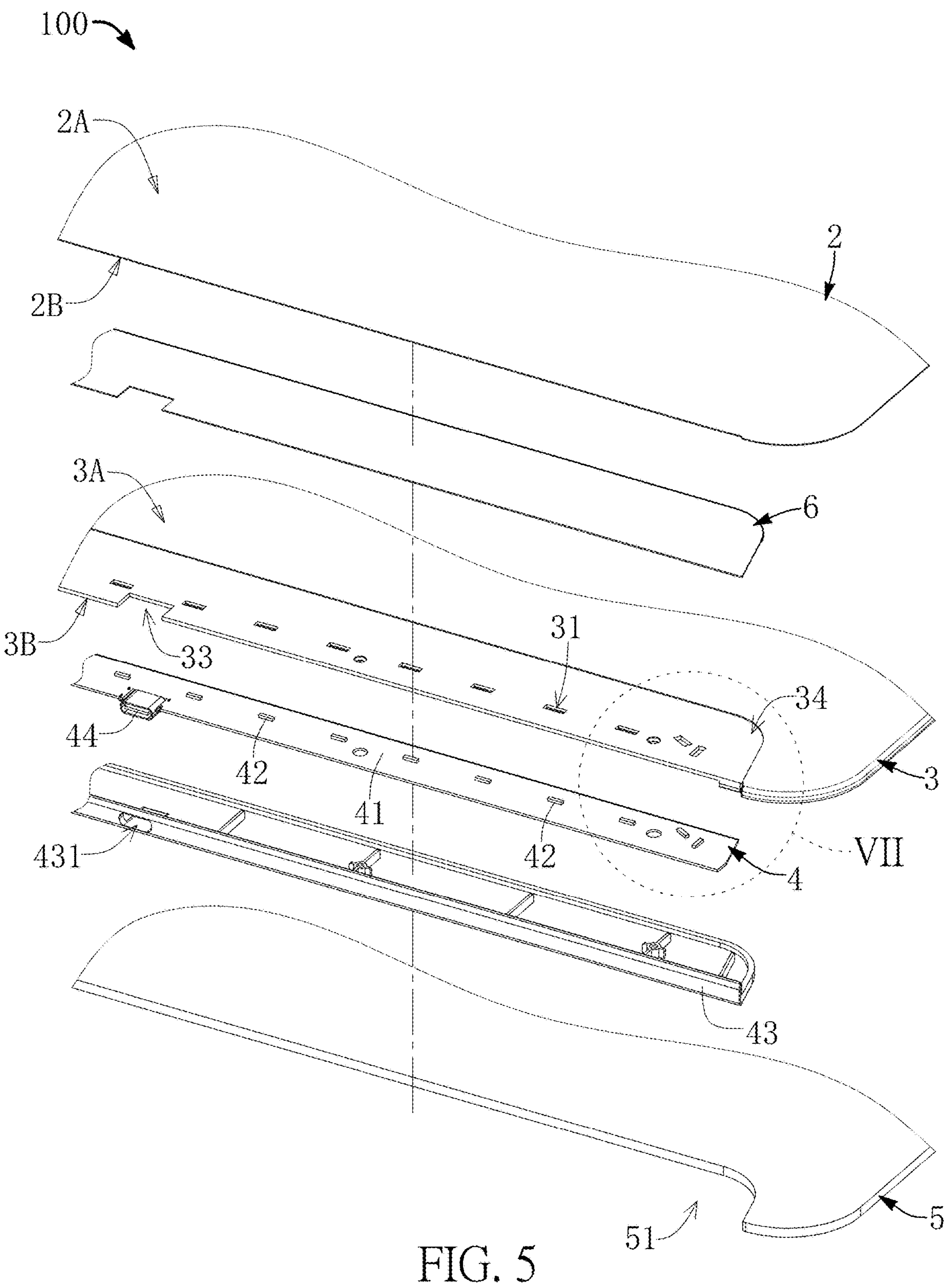
FIG. 5 and FIG. 6 are partially enlarged and exploded views showing the mouse pad in different angles of view according to the first embodiment of the present disclosure.
Figure 6:
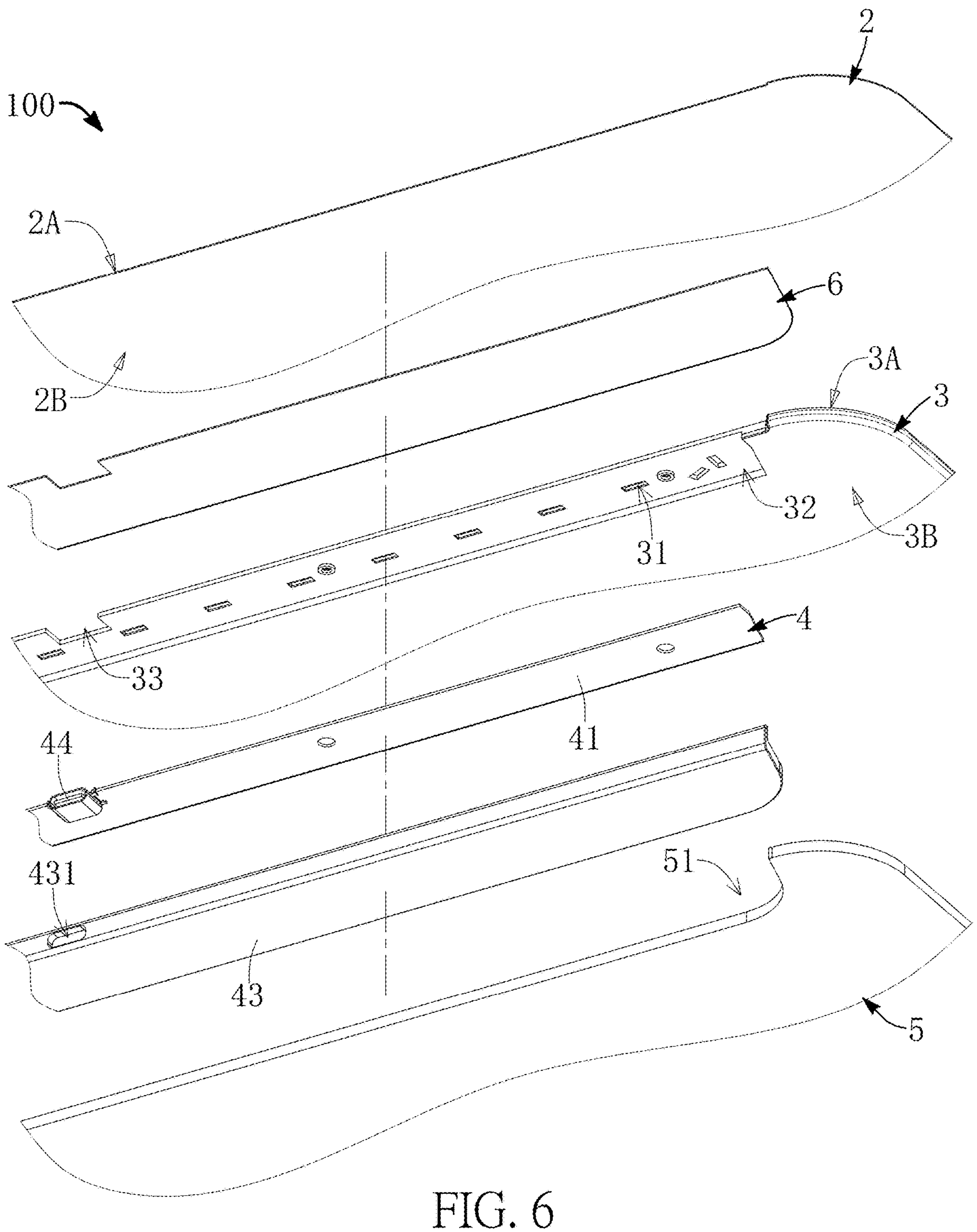
Figure 7:
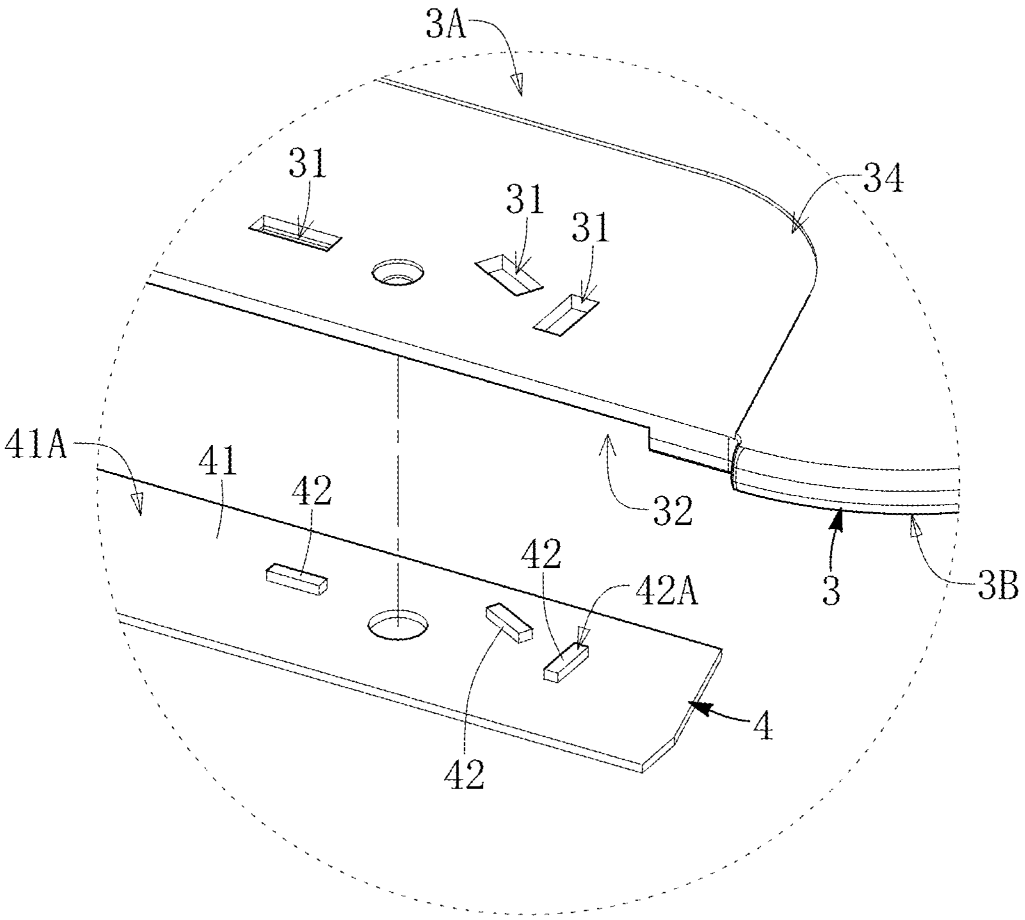
FIG. 7 is a schematic partially enlarged view of FIG. 5.

As shown in FIG. 1 to FIG. 7, FIG. 1 and FIG. 2 are schematic views showing a mouse pad in different angles of view according to a first embodiment of the present disclosure, FIG. 3 and FIG. 4 are exploded views showing the mouse pad in different angles of view according to the first embodiment of the present disclosure, FIG. 5 and FIG. 6 are partially enlarged and exploded views showing the mouse pad in different angles of view according to the first embodiment of the present disclosure, and FIG. 7 is a schematic partially enlarged view of FIG. 5.

The mouse pad 100 of the present embodiment includes a full flat contact surface 2A, a contact plate 2, a light guide body 3, a light emitting module 4, a base 5, and a light-shielding member 6. In different embodiments, the mouse pad 100 can have no light-shielding members 6.

The full flat contact surface 2A is arranged on one side surface of the mouse pad 100, and the full flat contact surface 2A is configured to allow a mouse to move to any position thereof. The full flat contact surface 2A is a completely flat surface, and the mouse is movable to any position on the full flat contact surface 2A. In other words, when a user controls the mouse on the full flat contact surface 2A of the mouse pad 100, the mouse is movable to any position on the full flat contact surface 2A, and during the movement process, the mouse is not subjected to any obstruction.

In the related art, one side of a conventional mouse pad with a lighting function is usually disposed with a control box. Therefore, when the user controls the mouse on the conventional mouse pad, the mouse may easily collide with the control box, thereby resulting in a relatively inferior user experience. In other words, a movable range of the mouse is limited by a size and a location of the control box.

One side surface of the contact plate 2 defines an entirety of the full flat contact surface 2A. In one of the embodiments of the present disclosure, the contact plate 2 can be a single-layer or a multilayer structure and is not limited by the present embodiment. In one of the embodiments where the contact plate 2 has the multilayer structure, the full flat contact surface 2A refers to the side surface of an outermost layer of the contact plate 2.

Two opposite side surfaces of the light guide body 3 are respectively defined as a first top surface 3A and a first bottom surface 3B. The contact plate 2 is disposed on the first top surface 3A. The contact plate 2 may, for example, be fixed to the light guide body 3 by an adhesive. The light guide body 3 has a plurality of light guide holes 31, and each of the light guide holes 31 penetrates through the light guide body 3. In practice, the light guide body 3 is commonly known as a light guide plate (LGP) or light guide film (LGF).

The light emitting module 4 includes a circuit board 41 and a plurality of light emitting units 42. The circuit board 41 includes other electronic components for the proper operation of the light emitting units 42. The circuit board 41 is disposed on the first bottom surface 3B of the light guide body 3, and the circuit board 41 is located between the light guide body 3 and the base 5. The plurality of light emitting units 42 are disposed on the circuit board 41, and the plurality of light emitting units 42 are respectively located in the plurality of light guide holes 31. The light emitting units 42 may be various types of LEDs. For example, the light emitting units 42 may be side-emitting LEDs.

The light guide body 3 can guide light beams emitted from the light emitting units 42 to a specific area according to practical requirements. For example, the light beams emitted from the plurality of the light emitting units 42 are emitted outward from an edge of the light guide body 3 by being guided through the light guide body 3. Accordingly, the user can see light emitted around a periphery of the light guide body 3.

A second top surface 42A of each of the light emitting units 42 is shielded by the contact plate 2, thereby preventing the light beams emitted from the light emitting units 42 from scattering toward the contact plate 2. In one of the embodiments of the present disclosure, the light emitting units 42 may be the side-emitting LEDs, and the second top surface 42A of each of the light emitting units 42 is not a light emitting surface.

As shown in FIG. 6 and FIG. 7, in one of the embodiments of the present disclosure, the first bottom surface 3B of the light guide body 3 further has a circuit board receiving groove 32. The circuit board receiving groove 32 accommodates the circuit board 41, a depth of the circuit board receiving groove 32 is not less than a thickness of the circuit board 41, an outer surface 41A of the circuit board 41 and the first bottom surface 3B of the light guide body 3 jointly define a flat surface, and the base 5 is disposed on the flat surface. This design ensures that the light guide body 3 and the circuit board 41 do not affect a flatness of the full flat contact surface 2A.

The base 5 is disposed on the first bottom surface 3B of the light guide body 3, and the light guide body 3 is located between the contact plate 2 and the base 5. A size of the base 5 may be approximately the same as a size of the contact plate 2. When the mouse pad 100 is placed on a desktop, a side of the base 5 opposite to the light guide body 3 is in contact with the desktop. The base 5 is mainly used as an overall supporting structure of the mouse pad 100. The base 5 may be formed of a fabric or a plastic structure, or other suitable materials according to practical requirements and is not limited by the present embodiment.

In one of the embodiments of the present disclosure, the light emitting module 4 further has a shell 43 that accommodates the circuit board 41. One side of the base 5 may have a notch 51 that accommodates the shell 43. The base 5 and the shell 43 jointly define a full flat bottom surface on another side surface of the mouse pad 100 (i.e., a bottom surface of the mouse pad 100). In other words, both side surfaces of the mouse pad 100 (the full flat contact surface 2A and the full flat bottom surface) are flat surfaces.

In different embodiments, the shell 43 of the light emitting module and the base 5 may be integrated as a single component. In other words, a portion of the base 5 may directly serve as the shell 43 of the light emitting module 4, and the circuit board 41 is directly fixed in the base 5.

In one of the embodiments of the present disclosure, the light emitting module 4 further includes a charging connector 44 that is disposed on the circuit board 41. The light guide body 3 further includes a connector notch 33 that accommodates the charging connector 44. The shell 43 further has a connection port 431 from which the charging connector 44 is exposed.

It should be noted that because a position of the charging connector 44 does not affect the full flat contact surface 2A, the charging connector 44 may be disposed on any side of the mouse pad 100 according to practical requirements. For the user, the full flat contact surface 2A is configured to allow the mouse to move to any position on the mouse pad 100. Therefore, the user can adjust the charging connector 44 of the mouse pad 100 to an intended position according to practical requirements. In other words, when the user wants to connect the mouse pad 100 to a power source, the user can rotate the mouse pad 100 according to a position of the power source, and no matter which direction the charging connector 44 of the mouse pad 100 is facing, the user can still move the mouse to any position on the full flat contact surface 2A.

In the conventional mouse pad with the lighting function, the control box protrudes from a surface of the mouse pad. Therefore, if the control box is not oriented toward the front, the user will be blocked by the control box when using the mouse, thereby making operation of the conventional mouse pad difficult for the user.

The light-shielding member 6 is disposed on the first top surface 3A of the light guide body 3 and is located between the contact plate 2 and the light guide body 3, and the light-shielding member 6 shields the second top surface 42A of each of the light emitting units 42 (as shown in FIG. 7). The light-shielding member 6 may, for example, be made of a material capable of absorbing the light beams emitted from the light emitting units 42, or may have a structure that reflects the light beams emitted from the light emitting units 42. The design of the light-shielding member 6 further prevents the light beams emitted from the light emitting units 42 from being projected toward the contact plate 2. In one of the embodiments of the present disclosure, the light-shielding member 6 may be adhered to the first top surface 3A of the light guide body 3 by an adhesive.

In different embodiments, the first top surface 3A of the light guide body 3 has a light-shielding member receiving groove 34 recessed in the first top surface thereof (as shown in FIG. 5), and the light-shielding member 6 is disposed in the light-shielding member receiving groove 34. A depth of the light-shielding member receiving groove 34 is not less than a thickness of the light-shielding member 6. An outer surface of the light-shielding member 6 and the first top surface 3A of the light guide body 3 jointly define a flat surface, and the contact plate 2 is disposed on the flat surface. Through the design of the light-shielding member receiving groove 34, the light-shielding member 6 is allowed to be disposed at an intended position between the contact plate 2 and the light guide body 3 without an adhesive. Moreover, through the design of the outer surface of the light-shielding member 6 and the first top surface 3A of the light guide body 3 jointly defining the flat surface, when the contact plate 2 is fixed to the light guide body 3 that includes the light-shielding member 6, the contact plate 2 can maintain a flat configuration at the position corresponding to the light-shielding member 6.

Second Embodiment

Figure 8:
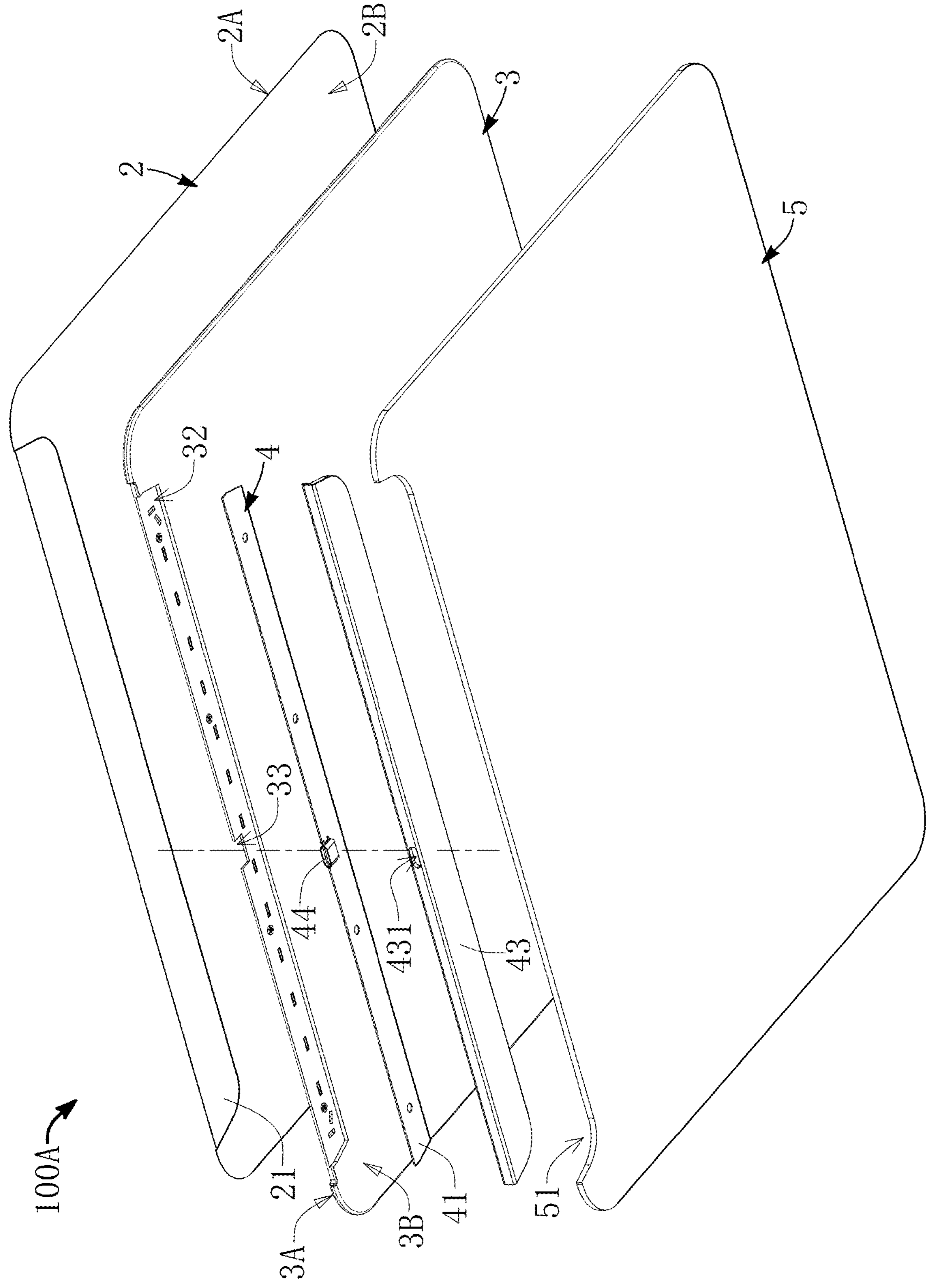
FIG. 8 is a schematic exploded view of the mouse pad according to a second embodiment of the present disclosure.

As shown in FIG. 8, FIG. 8 is a schematic exploded view of the mouse pad according to a second embodiment of the present disclosure. The difference between this embodiment and the previous embodiment is that the mouse pad 100A of the present embodiment does not have the light-shielding member 6, and the contact plate 2 further includes a blocking area 21. The blocking area 21 shields the plurality of light guide holes 31, thereby blocking the light beams emitted from the light emitting units 42. In one of the embodiments of the present disclosure, the blocking area 21 has a light-reflecting structure (not shown in the figures), and the light-reflecting structure reflects the light beams emitted from each of the light emitting units 42 through the light guide holes 31. In one of the embodiments of the present disclosure, the blocking area 21 has a light-absorbing structure (not shown in the figures), and the light-absorbing structure absorbs the light beams emitted from each of the light emitting units 42 through the light guide holes 31. In practice, the light-reflecting structure and the light-absorbing structure may, respectively, be formed by a reflective coating or a light-absorbing coating on the blocking area 21. In different embodiments, the light-reflecting structure may also be a microstructure formed on the blocking area 21.

In practice, the blocking area 21 may be a groove recessed in a third bottom surface 2B of the contact plate 2 thereof, and the light-reflecting structure or the light-absorbing structure is a coating or a film coated in the blocking area 21. This design ensures that, after the contact plate 2 is connected to the light guide body 3, the full flat contact surface 2A remains flat at the region corresponding to the blocking area 21.

Third Embodiment

Figure 9:
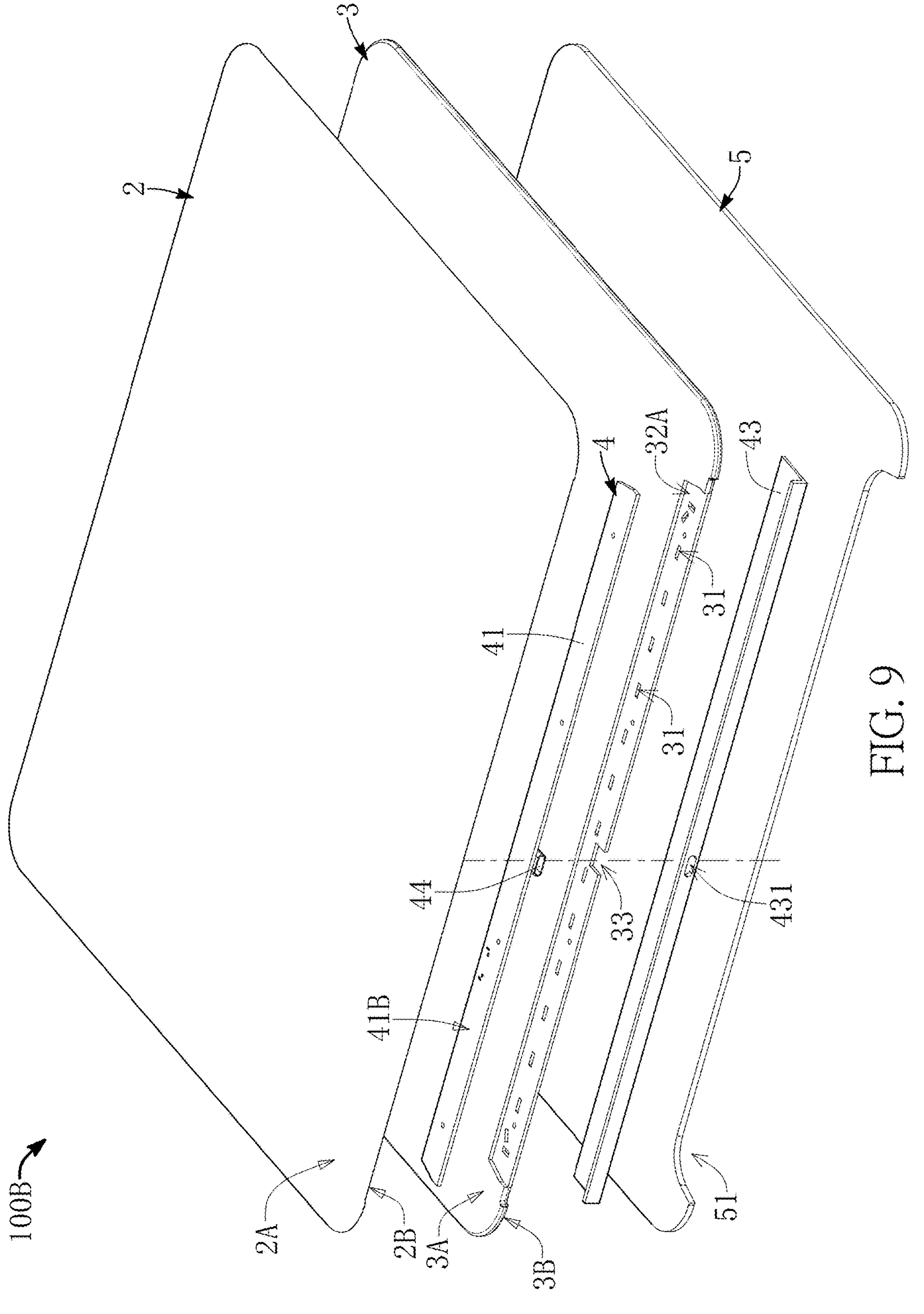
FIG. 9 and FIG. 10 are exploded views showing the mouse pad in different angles of view according to a third embodiment of the present disclosure.
Figure 10:
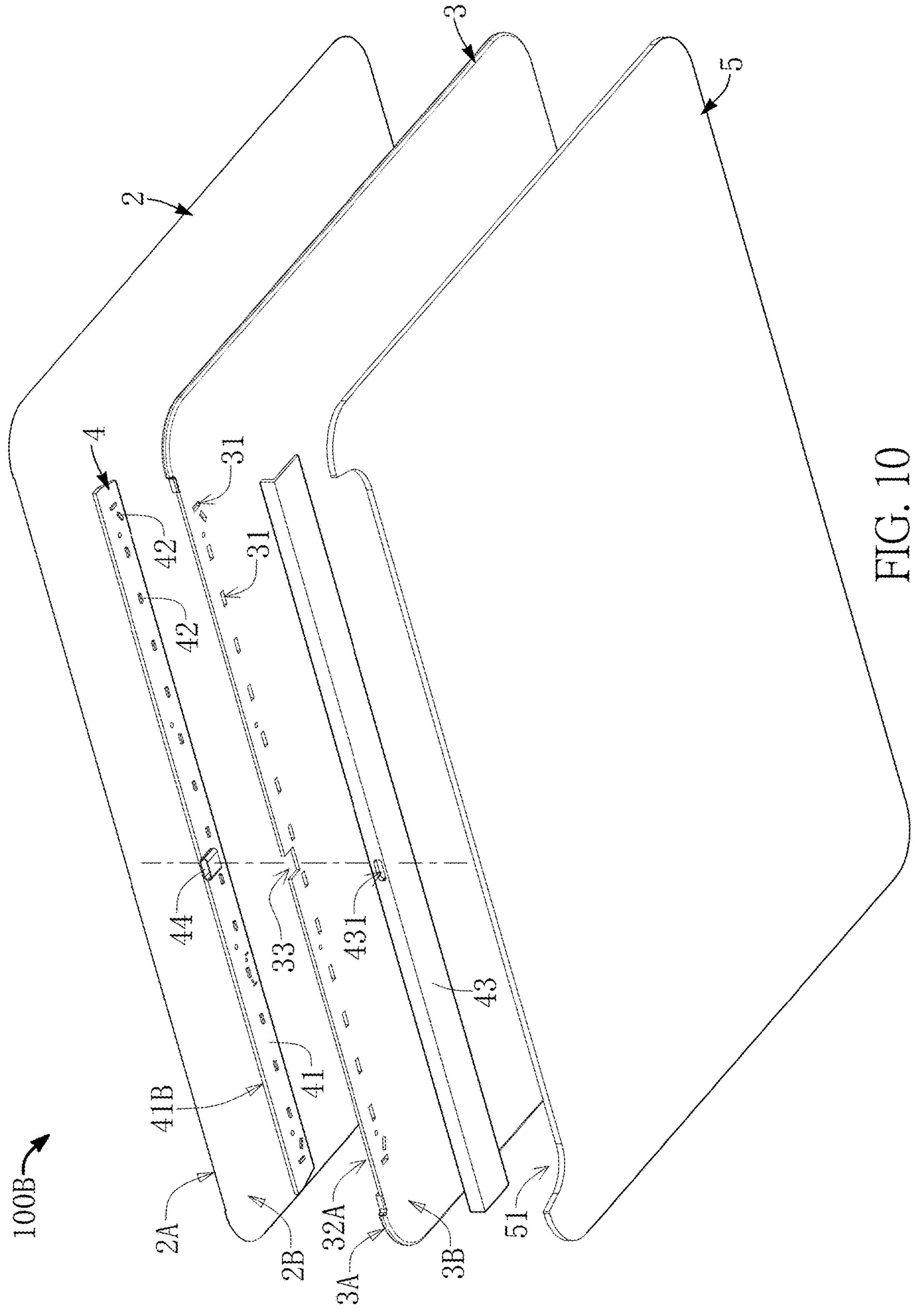

As shown in FIG. 9 and FIG. 10, FIG. 9 and FIG. 10 are exploded views showing the mouse pad in different angles of view according to a third embodiment of the present disclosure. The difference between this embodiment and the previous embodiments is that the mouse pad 100B does not have the light-shielding member 6, and the mouse pad 100B also does not have the blocking area 21. The first top surface 3A of the light guide body 3 of the mouse pad 100B of the present embodiment has a circuit board receiving groove 32A. The circuit board 41 is disposed in the circuit board receiving groove 32A, and the circuit board 41 is located between the contact plate 2 and the light guide body 3. A depth of the circuit board receiving groove 32A is not less than a thickness of the circuit board 41, and a second bottom surface 41B of the circuit board 41 is disposed to be flush with the first top surface 3A of the light guide body 3.

Beneficial Effects of the Embodiments

Therefore, in the mouse pad provided by the present disclosure, by virtue of the design of the full flat contact surface, the contact plate, the light guide body, the base, and the light emitting module, the mouse set on the full flat contact surface can be moved to any position according to practical requirements of the user, thereby effectively improving the user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse pad, comprising:

a full flat contact surface arranged on one side surface of the mouse pad, wherein the full flat contact surface is configured to allow a mouse to move to any position thereof;

a contact plate, one side surface of the contact plate defining an entirety of the full flat contact surface;

a light guide body having two opposite side surfaces that are respectively defined as a first top surface and a first bottom surface, wherein the contact plate is disposed on the first top surface, and the light guide body has a plurality of light guide holes;

a base disposed on the first bottom surface of the light guide body, wherein the light guide body is located between the contact plate and the base; and a light emitting module including:

a circuit board disposed on the first bottom surface of the light guide body, wherein the circuit board is located between the light guide body and the base; and a plurality of light emitting units disposed on the circuit board, wherein the plurality of light emitting units are respectively located in the plurality of light guide holes, light beams emitted from the plurality of light emitting units are emitted outward from an edge of the light guide body by being guided through the light guide body, and a second top surface of each of the light emitting units is shielded by the contact plate;

wherein the light guide body has a light-shielding member receiving groove recessed in the first top surface thereof, the light-shielding member is disposed in the light-shielding member receiving groove, and a depth of the light-shielding member receiving groove is not less than a thickness of the light-shielding member, and wherein an outer surface of the light-shielding member and the first top surface of the light guide body jointly define a first flat surface, and the contact plate is disposed on the first flat surface.

2. The mouse pad according to claim 1, wherein the light-shielding member is disposed on the first top surface of the light guide body and is located between the contact plate and the light guide body, and the light-shielding member is configured to shield the second top surface of each of the plurality of light-emitting units.

3. The mouse pad according to claim 1, wherein the light emitting module further includes a shell that accommodates the circuit board, the base has a notch that accommodates the shell, and the base and the shell jointly define a full flat bottom surface arranged on another side surface of the mouse pad.

4. The mouse pad according to claim 3, wherein the light guide body has a connector notch, the circuit board includes a charging connector that is located in the connector notch, and wherein the shell has a connection port from which the charging connector is exposed.

5. The mouse pad according to claim 1, wherein the first bottom surface of the light guide body has a circuit board receiving groove that accommodates the circuit board, a depth of the circuit board receiving groove is not less than a thickness of the circuit board, and wherein an outer surface of the circuit board and the first bottom surface of the light guide body jointly define a second flat surface, and the base is disposed on the second flat surface.

6. The mouse pad according to claim 1, wherein each of the light guide holes penetrates through the light guide body, and the contact plate includes a blocking area that shields the plurality of light guide holes, and the blocking area is configured to block the plurality of light beams emitted from the plurality of light emitting units.

7. The mouse pad according to claim 6, wherein the blocking area has a light-reflecting structure, and the light-reflecting structure is configured to reflect the plurality of light beams that are emitted from the light emitting units through the plurality of light guide holes, respectively.

8. The mouse pad according to claim 6, wherein the blocking area has a light-absorbing structure, and the light-absorbing structure is configured to absorb the plurality of light beams that are emitted from the light emitting units through the plurality of light guide holes, respectively.

9. A mouse pad, comprising:

a full flat contact surface arranged on one side surface of the mouse pad, wherein the full flat contact surface is configured to allow a mouse to move to any position thereof;

a contact plate, one side surface of the contact plate defining an entirety of the full flat contact surface;

a light guide body having two opposite side surfaces that are respectively defined as a first top surface and a first bottom surface, wherein the contact plate is disposed on the first top surface, and the light guide body has a plurality of light guide holes;

a base disposed on the first bottom surface of the light guide body, wherein the light guide body is located between the contact plate and the base; and a light emitting module including:

a circuit board disposed in a light-shielding member receiving groove of the first top surface of the light guide body, the circuit board located between the contact plate and the light guide body, wherein a depth of the light-shielding member receiving groove is not less than a thickness of the circuit board; and a plurality of light emitting units disposed on the circuit board, wherein the plurality of light emitting units are respectively located in the plurality of light guide holes, light beams emitted from the plurality of light emitting units are emitted outward from an edge of the light guide body by being guided through the light guide body.

10. The mouse pad according to claim 9, wherein each of the light guide holes penetrates through the light guide body.

11. The mouse pad according to claim 9, wherein the light emitting module further includes a shell that accommodates the circuit board, the base has a notch that accommodates the shell, and the shell is configured to shield the light beams emitted from the second top surface of the plurality of light emitting units.

12. The mouse pad according to claim 11, wherein the base and the shell jointly define a full flat bottom surface arranged on another side surface of the mouse pad.

13. The mouse pad according to claim 11, wherein the light guide body has a connector notch, the circuit board includes a charging connector that is located in the connector notch, and wherein the shell has a connection port from which the charging connector is exposed.

* * * * *